United States Patent [19]

Pillon

[11] 4,197,786

[45] Apr. 15, 1980

[54] SUPPORT JACK MORE PARTICULARLY ADAPTED TO SUPPORT A TOOL HOLDER OF A MACHINE TOOL AND IN PARTICULAR OF A POLISHING MACHINE

[75] Inventor: Marcel O. Pillon, Gergy, France

[73] Assignee: Pont-A-Mousson S.A., Nancy, France

[21] Appl. No.: 898,573

[22] Filed: Apr. 21, 1978

[30] Foreign Application Priority Data

Apr. 21, 1977 [FR] France ................................ 77 12035

[51] Int. Cl.² .......................... B24B 7/02; F01B 31/00
[52] U.S. Cl. .................................. 92/86; 51/109 R; 51/165.9; 91/52; 92/162 R; 92/165 R
[58] Field of Search ............ 92/86, 127, 86.5, 162 R, 92/162 P, 165 R, 117; 91/52, 390; 51/165.9, 109 R

[56] References Cited

U.S. PATENT DOCUMENTS

| 17,855 | 7/1857 | Gale | 92/162 R |
|---|---|---|---|
| 268,684 | 12/1882 | Jones | 92/172 X |
| 1,524,786 | 2/1925 | Vendeuil | 92/151 X |
| 2,291,243 | 7/1942 | Levy | 92/162 R |
| 3,663,071 | 5/1972 | Kates | 92/162 X |
| 4,026,562 | 5/1977 | Sparrow | 92/86 X |

FOREIGN PATENT DOCUMENTS

| 558804 | 6/1958 | Canada | 92/162 R |
|---|---|---|---|
| 2100575 | 1/1899 | Fed. Rep. of Germany | 92/162 R |

*Primary Examiner*—Irwin C. Cohen
*Attorney, Agent, or Firm*—Sughrue, Rothwell, Mion, Zinn and Macpeak

[57] ABSTRACT

The support jack comprises a cylinder and a piston which define therebetween a variable-volume chamber. An inlet aperture and an outlet aperture for control fluid are provided for the chamber. Escape passageways are provided in evenly-spaced relation about the rod of the piston and put the chamber in communication with the annular space between the fixed and moving component parts of the jack and open radially onto said space. These passageways create pressure drops which are higher than the pressure drops due to the annular space.

5 Claims, 5 Drawing Figures

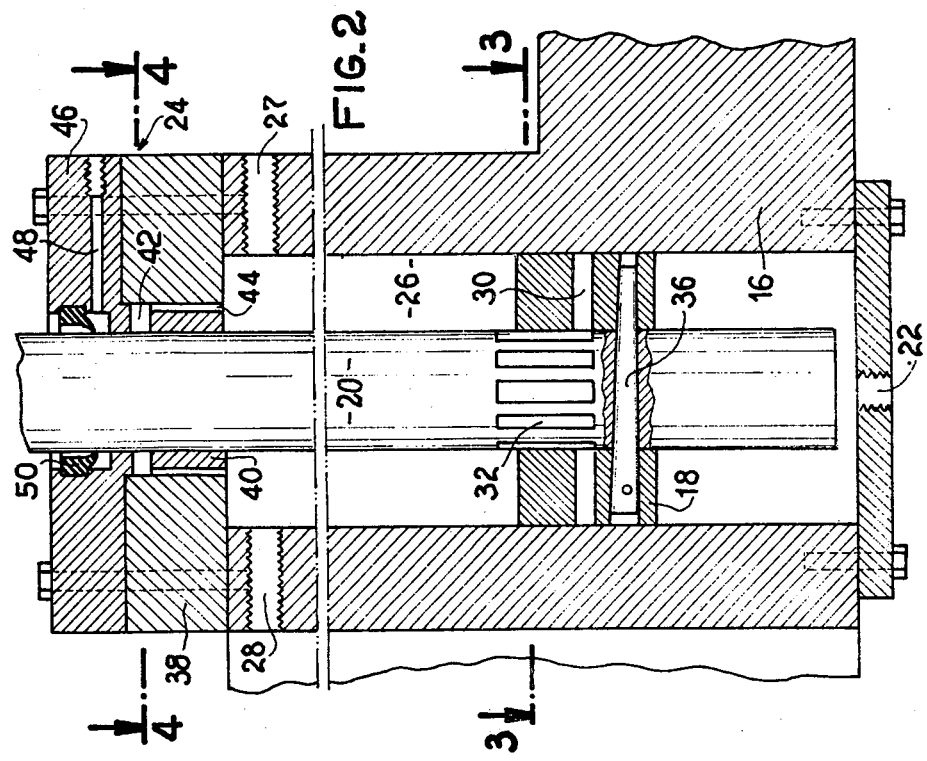
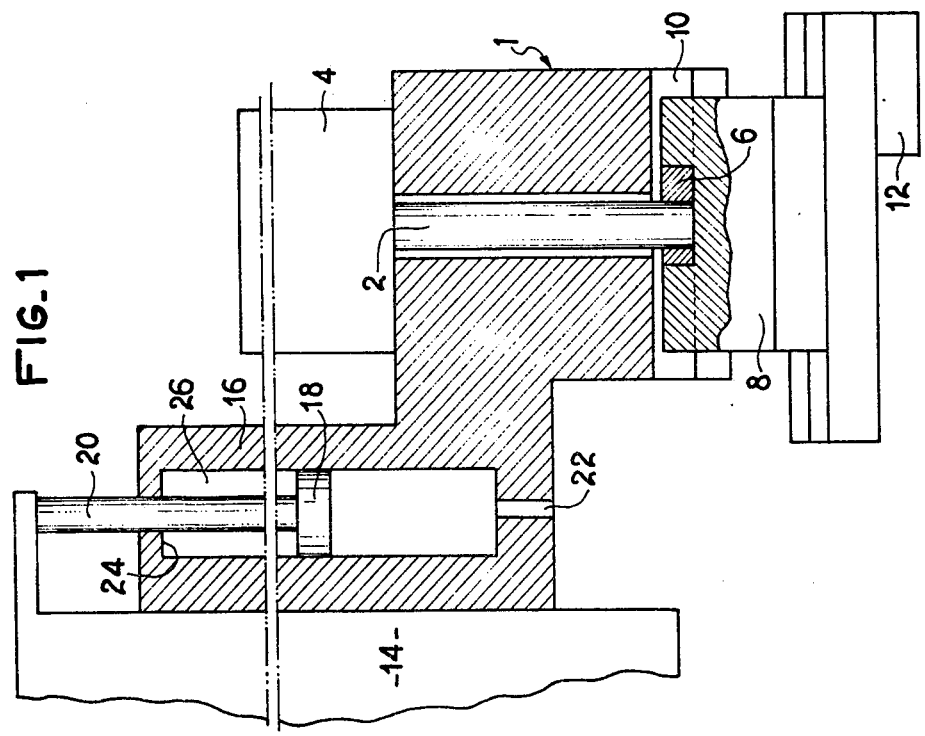

SUPPORT JACK MORE PARTICULARLY ADAPTED TO SUPPORT A TOOL HOLDER OF A MACHINE TOOL AND IN PARTICULAR OF A POLISHING MACHINE

The present invention relates to a support jack of the type comprising a cylinder and a piston which define therebetween a chamber of variable volume in which a control fluid is introduced.

In jacks of this type and more particularly in tool holder support jacks of machine tools, it is important that the pressure in the variable-volume chamber be maintained at a predetermined value. In order to reduce the risk of escape of fluid, there is usually disposed around the piston a sealing element, for example of an elastomer, which can easily slide along the wall of the cylinder. However, this sealing element is nonetheless the cause of friction which produces non-measurable forces which are added to or subtracted from the known force exerted by the control fluid in the chamber.

These forces are particularly disadvantageous when the support jack is intended for a tool holder of a polishing machine since the force exerted by the tool on the part to be machined is in this case a function of the difference between the weight of the tool holder and the force exerted by the jack. It is therefore essential that this difference, that is to say the pressure in the chamber of the jack, be maintained at an absolutely constant value.

An object of the present invention is to satisfy these requirements by providing a support jack in which the seal between the piston and the cylinder is achieved by means of a film of fluid corresponding to a controlled low escape flow.

According to the invention, there is provided a jack which comprises escape passageways which connect the variable-volume chamber to an annular space between the fixed and moving parts of the jack and open radially onto said space, said passageways producing pressure drops which are higher than those due to the free annular space.

According to a preferred embodiment, the escape passageways are provided in the piston and are equally spaced apart about the rod of the latter. Consequently, a film of fluid surrounds the piston between the latter and the wall of the cylinder and closes the space between these two parts.

Passageways may also be provided at the opposite end of the variable-volume chamber in the wall of the cylinder around the passage through this wall for the piston rod. There is no danger of any friction between the piston rod and the wall of the cylinder, or between the piston and the cylinder, limiting the displacement of the jack and producing forces liable to modify the action of the pressure in the variable-volume chamber.

The ensuing description of one embodiment, given by way of a non-limitative example and shown in the accompanying drawings, will reveal the advantages and features of the invention.

In the drawings:

FIG. 1 is a sectional view of a tool holder head of a polishing machine;

FIG. 2 is a sectional view to an enlarged scale of a support jack for the head shown in FIG. 1;

Figure 4:
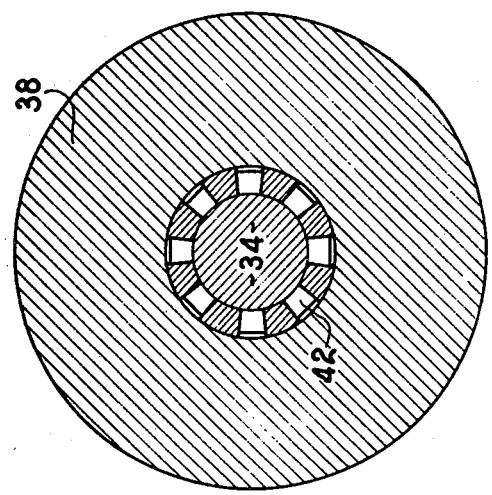
FIG. 4 is a sectional view taken on line 4—4 of FIG. 2.

A tool holder head of a polishing machine such as that shown in FIG. 1 comprises a body 1 through which there extends a shaft 2 which is connected at one end to a drive motor 4 and at its other end, through an eccentric system 6, to a tool holder 8. The latter is movable in translation in slideways 10 which are rigid with the body 1 and supports a tool 12, for example a grinding stone, which is thus subjected to a reciprocating rectilinear movement.

The body 1 is slidably mounted by slideways (not shown in FIG. 1) on a frame 14 of the machine. It comprises a support jack formed by means defining a hollow cylinder 16 cooperating with a piston 18 whose rod 20 is rigid with the frame 14. The cylinder 16 is provided with an aperture 22 in its lower part and defines between its upper wall 24 and the piston 18 a chamber 26 of variable volume. The pressure prevailing in this chamber controls the position of the cylinder 16 relative to the frame 14 of the machine and consequently the position of the tool relative to the workpiece to be machined.

In the case of a polishing machine, it is important to maintain the pressure of the tool 12 on the workpiece at a constant value, that is to say it is important that the difference between the force exerted by the weight of the body 1 and of the tool holder 8 and the force exerted in the opposite direction by the pressure of fluid prevailing in the chamber 26, remain constant irrespective of the shape of the workpiece, that is to say notwithstanding certain variations in the vertical position of the tool.

The chamber 26 is supplied with a control fluid which enters by way of an aperture 27 and leaves the chamber by way of an outlet aperture 28 which are formed in the vicinity of the wall 24 of the end of the cylinder.

The piston 18 is provided with a number of radial passageways 30 which are equally-spaced apart about the axis of the piston and open onto the space between the outer surface of this piston and the wall of the cylinder 16. At their opposite end, the passageways 30 communicate with axial passageways 32 formed in the outer surface of the rod 20 of the piston.

Figure 3:
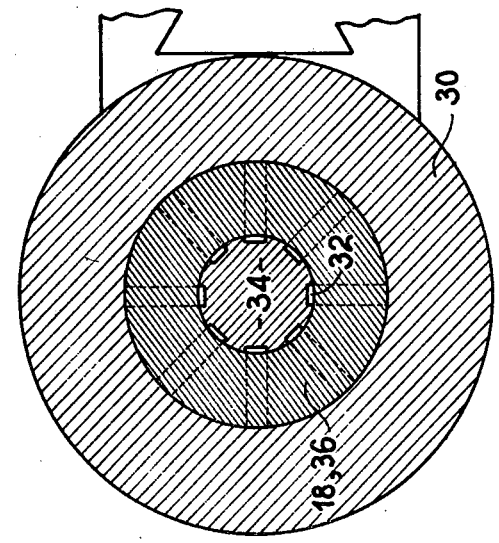
FIG. 3 is a sectional view taken on line 3—3 of FIG. 2.

Preferably, and as shown in FIG. 2, the piston is formed by a ring mounted on the rod 20 and fastened to the latter by a pin 36. The passageways 30 are drilled in this ring and are equally-spaced apart on the circumference of the latter (FIG. 3).

The axial passageways 32 are formed by flats formed in the outer surface of the rod 20, each flat 32 corresponding to a passageway 30. The height of the passageways 32 is sufficient to put the passageways 30 in communication with the variable-volume chamber 26 so that the fluid contained in this chamber escapes in a regular manner by way of the passageways 32 and the passageways 30 and flows around the piston 18 in the annular space between the latter and the wall of the cylinder 16. The dimensions of the passageways 32 are so chosen as to create in these passageways a pressure drop which is distinctly higher than the pressure drop produced in the annular space between the piston and the cylinder. The fluid which escapes is discharged by way of the aperture 22 at the end of the cylinder 16 and may be received in a tank for recycling. The inlet aperture 27 of the chamber 26 is constantly in communication with a source of fluid which produces a regular supply of fluid to this chamber and maintains the pressure at the desired predetermined value. The flow of fluid by way of the passageways 32 and 30 is exactly known and controlled.

Preferably, the wall 24 of the end of the cylinder is also provided with escape passageways around the rod 20. For example, this wall is formed by an annular ring 38 which surrounds a sleeve 40 mounted therebetween and the rod 20. The sleeve 40 is provided with a number of radial passageways 42 which are evenly spaced apart around its circumference and extend throughout the thickness of the sleeve. These passageways put the space between the rod 20 and the sleeve 40 in communication with longitudinal passageways 44 formed between the sleeve 40 and the ring 38 and communicating with the variable-volume chamber 26. Preferably, the passageways 44 are formed by flats on the outer surface of the sleeve 40 and are defined between these flats and the inner surface of the ring 38. In the same way as the passageways 32, they create a pressure drop higher than the pressure drop produced in the space between the sleeve 40 and the rod 29.

The sleeve 40 is extended outwardly and is rigid with a plate 46 which is secured to the ring 38 and provided with a radial passageway 48 for discharging the fluid escaping from the passageways 42 along the rod 20 to the exterior. A sealing ring having lip portions 50 may be mounted between the plate 46 and the rod 20 so as to wipe this rod when the control fluid is formed by oil or the like.

Figure 5:
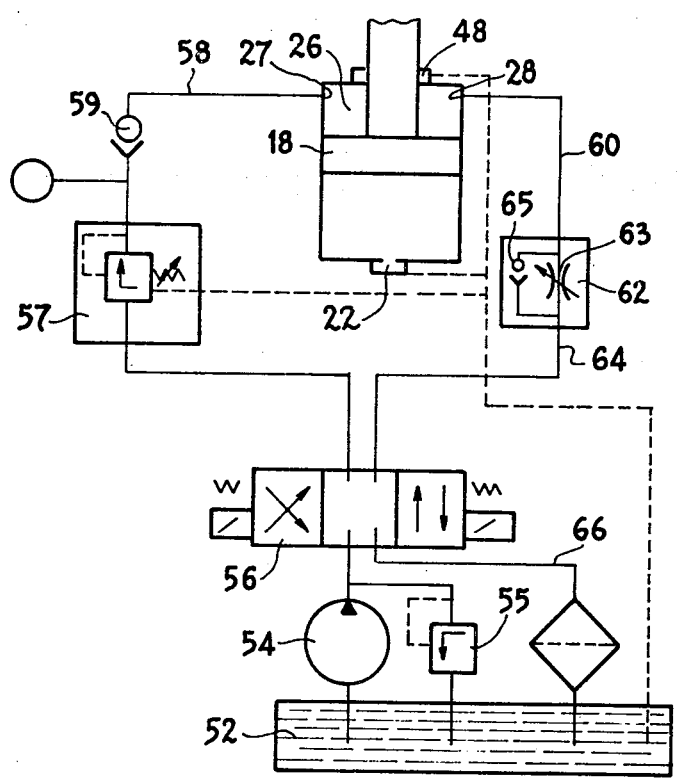
FIG. 5 is a diagram of an example of a control circuit for a jack according to the invention.

The pressure in the chamber 26 may be for example controlled by means of a hydraulic circuit of the type shown in FIG. 5. The control fluid retained in a tank 52 is driven by a pump associated with a discharge valve 55. The pump 54 is connected through a distributing valve 56, on one hand, to a pressure regulator 57 communicating by way of a passageway 58 with the inlet aperture 27 of the chamber 26 (a check-valve 59 being interposed between the pressure regulator and the passageway 58) and, on the other hand, by way of a passageway 64 and a device 62 comprising in parallel a calibrated orifice 63 and a check-valve 65, to a passageway 60 and the outlet aperture 28 of the chamber. The distributing valve 56 is provided with a passageway 66 for return of the fluid to the tank 52.

The aperture 22 of the cylinder and the discharge aperture 48 are connected to the tank 52 by return passageways 68.

When it is desired to establish in the variable-volume chamber 26 a pressure corresponding to a predetermined value, the distributing valve 56 is set to put the pump 54 in communication with the pressure regulator 57, while the device 62 is put in communication with the return passageway 66. In this position, the control fluid enters the chamber 26 by way of the inlet aperture 27 under pressure controlled by the pressure regulator and gradually fills this chamber. When the fluid reaches the outlet aperture 28, a circulation of fluid is established by way of the calibrated orifice 63, the distributing valve 56 and the return passageway 66.

In the course of utilization, the chamber 26 remains constantly in communication with the fluid tank 52, the check-valve 59 allowing a constant supply of fluid with a low rate of flow substantially corresponding to the escape flow through the passageways 32 and 30 of the piston and the passageways 44 and 42 of the passage of the rod 20 through the cylinder end wall. Consequently, the pressure is maintained at the desired value in the chamber 26.

However, if a force on the piston or on the cylinder tends to modify the pressure in the chamber, this pressure is automatically re-established. Indeed, when the force tends to decrease the volume of the chamber 26, the pressure in the latter tends to increase and this closes the check-valve 59 and stops the supply of control fluid. On the other hand, the flow of the fluid by way of the passageway 60 and the calibrated orifice 63 continues and the pressure then resumes its regulated value.

Inversely, if the force tends to increase the volume in the chamber 26, the pressure regulator 57 supplies additional fluid to re-establish the desired pressure. Consequently, the response is practically immediate and the pressure exerted on the workpiece to be machined remains constant.

The pressure in the chamber 26 may be brought to its maximum value by shifting the distributing valve 56 in such manner as to put the pump 54 in communication with the device 62, while the regulator 57 is put in communication with the return passageway 66. In this case, the chamber 26 is supplied with fluid through the check-valve 65, the passageway 60 and the aperture 28. On the other hand, there can be no return of fluid by way of the aperture 27 and the passageway 58. The check-valve 59 precludes flow of the fluid in this direction.

It is therefore possible to place the tool holder head in a given extreme position and maintain it in this position during the required period. For example, the tool holder head of a polishing machine may be raised to the inoperative position thereof to allow changing the workpiece or changing the tool. As the escapes of fluid through the piston and the wall of the cylinder are at a very low rate of flow and are constantly compensated for by the supply of fluid by the pump 54, this inoperative position may be maintained for the desired period.

There is consequently provided by the invention a jack which is capable of supporting with very high precision various parts, and in particular a tool holder of a machine tool, and with which a fine and rapid adjustment can always be achieved owing to an easy relative sliding of the piston and cylinder, so that the force exerted by the tool held is maintained irrespective of the irregularities of the workpiece.

Having now described my invention what I claim as new and desire to secure by Letters Patent is:

1. A support jack more particularly adapted to support a tool holder of a machine tool, and in particular of a polishing machine, comprising wall means defining a cylinder, piston means coaxial with the cylinder and comprising a piston rod and a piston member combined with the piston rod, means defining a passage in said wall means for the passage of said piston rod, the piston member being slidable in the cylinder and defining with an end of the cylinder a variable-volume chamber, means defining an inlet aperture for supplying control fluid to the variable-volume chamber, means defining an outlet aperture for discharge of the control fluid from the variable-volume chamber, the piston member having an outer peripheral surface which defines a first annular clearance with said wall means, said means defining said passage defining a second annular clearance therebetween and said piston rod, fluid escape passageways in said piston means and evenly spaced apart around said piston rod and putting the variable-volume chamber in communication with said first annular clearance by way of said piston means, said escape passageways creating a throttle pressure drop between said variable-volume chamber and said first annular clearance which is higher than a pressure drop produced in said first annular clearance between said variable-volume chamber and an axially opposite side of the piston, the escape passageways comprising substantially radially extending passageways in the piston member which are evenly spaced apart and open onto the outer peripheral surface of the piston member and axially extending passageways which are defined between grooves in an outer surface of the piston rod and the piston member and extend the passageways in the piston member.

2. A support jack more particularly adapted to support a tool holder of a machine tool, and in particular of a polishing machine, comprising wall means defining a cylinder, piston means coaxial with the cylinder and comprising a piston rod and a piston member combined with the piston rod, means defining a passage in said wall means for the passage of said piston rod, the piston member being slidable in the cylinder and defining with an end of the cylinder a variable-volume chamber, means defining an inlet aperture for supplying control fluid to the variable-volume chamber, means defining an outlet aperture for discharge of the control fluid from the variable-volume chamber, the piston member having an outer peripheral surface which defines a first annular clearance with said wall means, said means defining said passage defining a second annular clearance therebetween and said piston rod, fluid escape passageways in said piston means and evenly spaced apart around said piston rod and putting the variable-volume chamber in communication with said first annular clearance by way of said piston means, said escape passageways creating a throttle pressure drop between said variable-volume chamber and said first annular clearance which is higher than a pressure drop produced in said first annular clearance between said variable-volume chamber and an axially opposite side of the piston, the escape passageways comprising passageways which are located in the piston member and open onto said outer peripheral surface and axially extending passageways which are defined between the piston member and flats in an outer surface of the piston rod and extend the passageways located in the piston member.

3. A support jack more particularly adapted to support a tool holder of a machine tool, and in particular of a polishing machine, comprising wall means defining a cylinder which has an end wall, piston means coaxial with the cylinder and comprising a piston rod and a piston member combined with the piston rod, the end wall defining a cavity for the passage of the piston rod, the piston member being slidable in the cylinder and defining with said end wall a variable-volume chamber, means defining an inlet aperture for supplying control fluid to the variable-volume chamber, means defining an outlet aperture for discharge of the control fluid from the variable-volume chamber, the piston member having an outer peripheral surface which defines a first annular clearance with said wall means, fluid escape passageways in said piston means and evenly spaced apart around said piston rod and putting the variable-volume chamber in communication with said first annular clearance by way of said piston means, said escape passageways creating a throttle pressure drop between said variable-volume chamber and said first annular clearance which is higher than a pressure drop produced in said first annular clearance between said variable-volume chamber and an axially opposite side of the piston, an annular sleeve mounted in said cavity between said cavity and said piston rod and defining a second annular clearance with said piston rod, means defining substantially radially extending passageways which open onto said second annular clearance, said annular sleeve having an outer surface which defines with said cavity axially extending passageways which extend said substantially radially extending passageways and open onto said variable-volume chamber, said substantially radially extending passageways and axially extending passageways constituting second escape passageways which create a throttle pressure drop between said variable-volume chamber and said second annular clearance which is higher than a pressure drop produced in said second annular clearance between said variable-volume chamber and an axially opposite side of said annular sleeve.

4. A jack as claimed in claim 3, comprising a plurality of flats on said outer surface of the annular sleeve which define said axially extending passageways with said cavity.

5. A jack as claimed in claim 3, wherein the radially extending passageways are defined in said annular sleeve in evenly-spaced apart relation.

* * * * *